(12) United States Patent
Eberlein

(10) Patent No.: US 7,734,648 B2
(45) Date of Patent: Jun. 8, 2010

(54) UPDATE MANAGER FOR DATABASE SYSTEM

(75) Inventor: Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 267 days.

(21) Appl. No.: 11/401,423

(22) Filed: Apr. 11, 2006

(65) Prior Publication Data

US 2007/0239800 A1    Oct. 11, 2007

(51) Int. Cl.
 *G06F 17/30* (2006.01)
(52) U.S. Cl. ............................ 707/783; 707/955
(58) Field of Classification Search ............... 707/1–3, 707/6, 8–10, 100–102, 200, 201, 203, 205; 709/201, 203; 713/168, 178, 185
 See application file for complete search history.

(56) References Cited

U.S. PATENT DOCUMENTS

| | | | | |
|---|---|---|---|---|
| 5,410,697 A | * | 4/1995 | Baird et al. ................ | 711/152 |
| 5,999,930 A | * | 12/1999 | Wolff ........................ | 707/8 |
| 6,732,124 B1 | * | 5/2004 | Koseki et al. ............... | 707/202 |
| 6,968,456 B1 | * | 11/2005 | Tripathi et al. .............. | 707/202 |
| 7,483,905 B2 | * | 1/2009 | Gauweiler .................. | 707/101 |
| 2006/0173864 A1 | * | 8/2006 | Dart et al. ................... | 707/100 |

OTHER PUBLICATIONS

SAP, The SAP Lock Concept (BC-CST-EQ), May 12, 2007, 67 pgs.

\* cited by examiner

*Primary Examiner*—Mohammad Ali
*Assistant Examiner*—Marc R Filipczyk
(74) *Attorney, Agent, or Firm*—Kenyon & Kenyon LLP

(57) ABSTRACT

A database management protocol exchanges update tokens between a client and a server on which the database resides. When a client requests data to be read from a database, an update manager either reads an update token stored therein or generates one dynamically. The update token represents a current state of the data object being read. Sometime thereafter, if the client requests new data to be stored in the object, the client may furnish the update token back to the update manager. The update manager compares the client's update token to a local update token representing a current state of the database and, if they match, determines that the state has not changed. If they do not match, an error results.

16 Claims, 2 Drawing Sheets

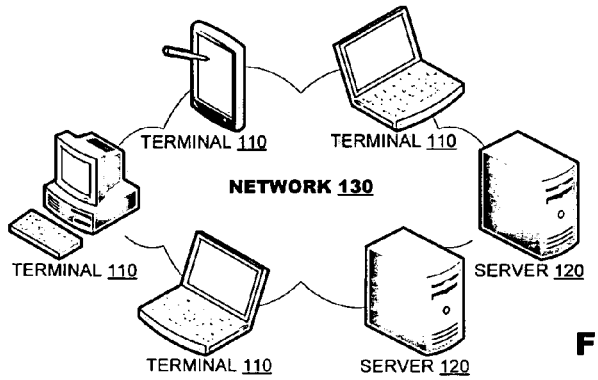
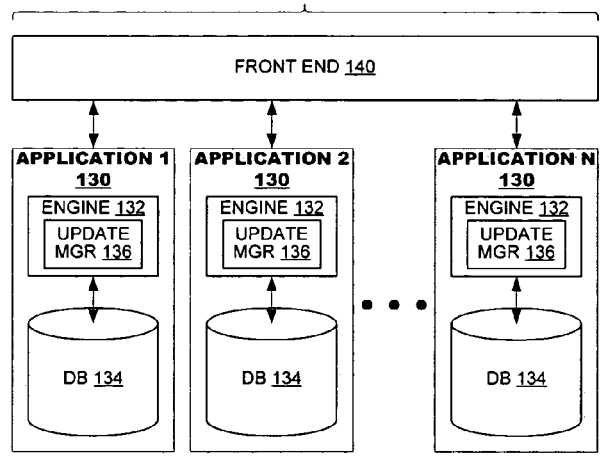
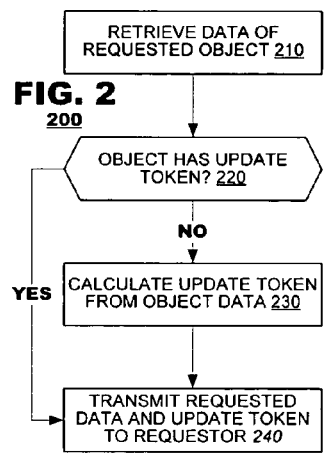
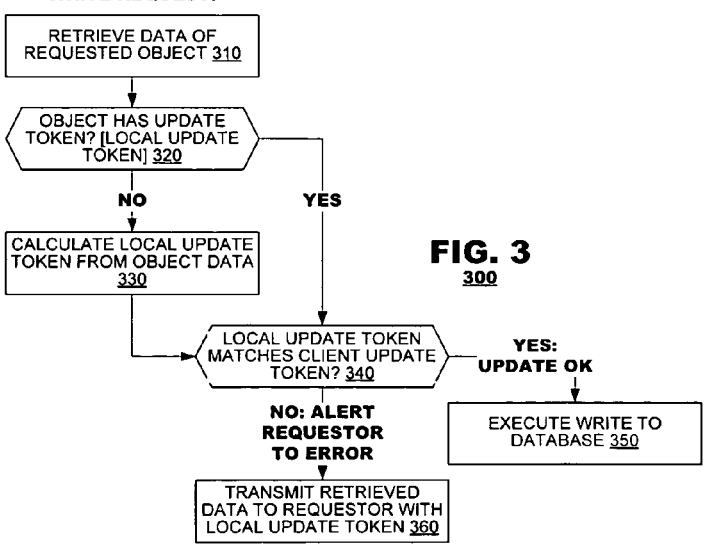

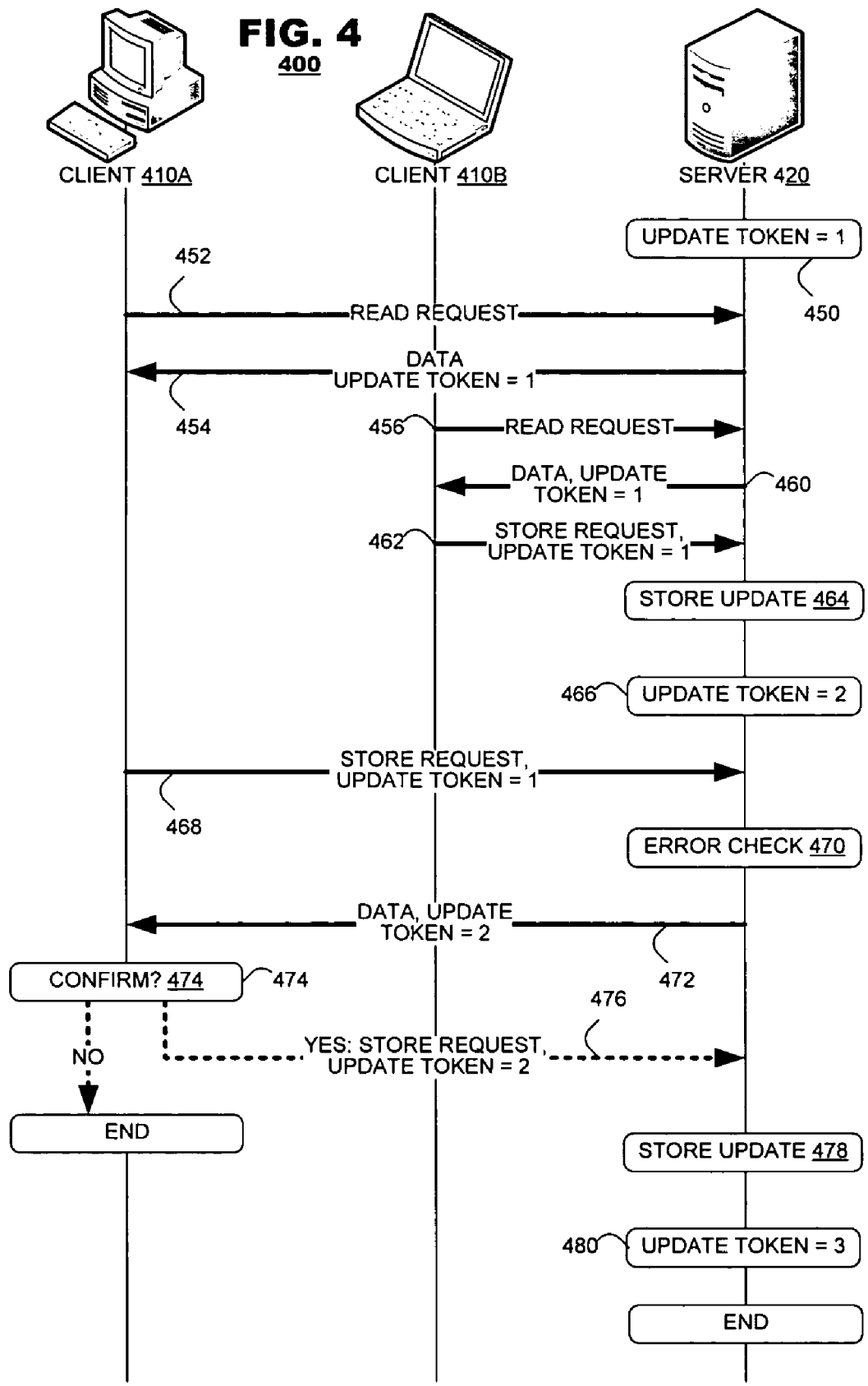

UPDATE MANAGER FOR DATABASE SYSTEM

BACKGROUND

Embodiments of the present invention relate to a management system for databases and, in particular, for managing multiple concurrent and possibly inconsistent requests from multiple users to change common data records.

Modern businesses use computers across almost all business functions. Computer systems model business transactions and automatically create and update data records in databases. A bank, for example, uses a computer system to open commercial loans. Database(s) in the bank's computer system serves as a repository for information on the bank's customers, terms and conditions of loans extended to those customers, customer payment history, etc. Bank employees typically must interact with the computer system to open new loans before they are approved and money is extended to a customer. As the computer system advances through its operations, it creates and updates several data objects. This is but one example; computer systems develop data records as they hire and fire employees, issue purchase orders, provide quotes to customers, arrange for product shipments and design products, among others. Many firms' computer systems provide enterprise management functions, which represent an integration of a several business and financial applications and, of course, underlying data sets.

In such systems, computer applications often field requests from a variety of computer users, which involve requests to read, update and store data in databases. The various computer users may operate independently, unaware of the activity of other users. At times, multiple users may issue concurrent requests directed to a common data object within a database. If the concurrent requests merely require data to be read from a database, typically no adverse consequences arise. If the requests, however, require data in the database to be changed, performance issues can be implicated.

Consider a simple example where two users both read and update customer data. Both users have local copies of customer address data on their computers. A first user enters a change of address representing the customer's relocation from one city to another. The data is stored in the database. Afterward, the second user notices a typographical error in the now-stale customer address (say, the city name) and corrects it. Hypothetically, the second user may enter a command that causes only the city field to be stored in the database. If the second user's command were permitted to proceed, a data inconsistency may occur because the street, state and ZIP CODE fields in the customer record may contain data as the first user had specified it but the city field will contain obsolete data.

Various database management protocols are known but they typically require control over the design of the database itself. Such protocols are inappropriate for many modern computer systems which are assembled from a variety of heterogeneous applications and databases. Accordingly, there is a need in the art for a database management protocol that is non-invasive—it works equally as well with databases that have native update controls and those that do not.

BRIEF DESCRIPTION OF THE DRAWINGS

FIG. 1 is a simplified diagram of a computer system according to an embodiment of the present invention.

FIG. 2 illustrates a method according to an embodiment of the present invention.

FIG. 3 illustrates another method according to an embodiment of the present invention.

FIG. 4 is a data flow diagram according to an embodiment of the present invention.

DETAILED DESCRIPTION

Embodiments of the present invention provide a database management protocol that exchanges update tokens between a client and a server on which the database resides. When a client requests data to be read from a database, an update manager either reads an update token stored therein or generates one dynamically. The update token represents a current state of the data object being read. Sometime thereafter, if the client requests new data to be stored in the object, the client may furnish the update token back to the update manager. The update manager compares the client's update token to a local update token representing a current state of the database and, if they match, determines that the state has not changed. If they do not match, an error results.

FIG. 1 illustrates a computer system suitable for use with the present invention. The computer system 100 is shown as including one or more terminals 110 and servers 120 interconnected by a network 130. The system 100 may include various types of terminals 110 such as desktop and portable computer platforms, which may execute program applications as appropriate to satisfy the needs of a proprietor of the computer network. The sever(s) 120 may execute application programs in a centralized or distributed execution environment as appropriate to the proprietor's needs. Various network 130 topologies are known such as local area networks, wide area networks, virtual private networks and the like. Unless otherwise noted herein, variations among types of terminals 110, types of servers 120 and types of networks 130 are immaterial to the present discussion. For purposes of the present discussion, it is sufficient to note that operators at the terminals 110 may access and update data stored by databases within the servers 120.

As noted the server(s) 120 may execute application programs in a centralized or distributed manner. FIG. 1 illustrates several exemplary applications 130, which may include an execution engine 132 and supporting database 134. In highly complex execution environments, when several different applications contribute to an integrated execution environment, the applications 130 may be considered "backend" applications, each dedicated to a its own feature set within the integrated system. Such systems also may include a system "front end" application 140, which fields requests from operators and coordinates among the backend applications to perform the requests. In this regard, the operation of complex network systems is well known.

Embodiments of the present invention introduce an update manager 136 for use in a computer system. Particularly in systems with a large number of users, multiple users may access common data records simultaneously. Often, the users merely read stored data records for use in their assigned tasks. Users also may read data records and update them. Sometimes, multiple users may read and attempt to update the same data records simultaneously. Left unchecked, such attempts can introduce data inconsistencies which can create performance impairments for the system 100. The update manager 136 manages user attempts to store new data in data records to prevent such inconsistencies.

In the embodiment illustrated in FIG. 1, the update managers 136 are shown as components within application engines 132 and replicated within each backend application 130 of the system. In other embodiments (not shown), the system may employ a central update manager 136 which is inter-operable with each of the applications 130 for which an update control mechanism is desired.

To implement the update control policies, when a client requests a read of data from the database, the server 120 generates an "update token" and sends it to the client along with the requested data being read. The update token identifies the data of the data object from which data has been read. When a client 110 requests a write of data to the database (a database update), the client 110 returns the update token that it received during the read back to the server 120. The update manager 136 compares the update token received from the client 110 to a local copy of the update token. If they match, the server 120 may conclude that the target database object is unchanged from the time the client 110 read the record data to the present time. The requested write operation may be performed. If the update tokens do not match, the database has been changed. An error condition exists.

Several update control schemes are disclosed herein. In a first embodiment, the database 134 stores express version control information in association with the data records over which the update manager 136 has authority. The version control information may be used as an update token. This embodiment requires the database 134 to store version control information in the database as administrative data, which reduces the amount of database resources that are available for other uses. In another embodiment, the update manager 136 may generate an update token dynamically from substantive information contained in the data records. In a further embodiment, the update manager leverages change identifiers resident as substantive data within database objects. Each of these embodiments is described in further detail below.

FIG. 2 illustrates a method 200 according to an embodiment of the present invention, which may be invoked by an application to respond to a read request from a terminal. The read request identifies a data object being requested, typically by an object ID. In response, the application retrieves the requested data from its database and furnishes the data along with an update identifier (box 210). The method may determine whether the object possesses an update identifier (box 220). If not, the method 200 may calculate an update token based upon a hash function calculated with reference to data of the object (box 230). If so or upon conclusion of the token calculation, the method 200 may transmit the requested data to the client along with the update token.

The embodiment of FIG. 2 may manage updates to a group of databases which may have very different support for update management. As is known, some database systems may assign timestamps to data objects representing the time when data was most recently written to the object. Other database systems may include version counters that represent the number of times data has been written to a data object. For such database systems, the timestamps or version counters may be taken directly as update tokens and passed to clients.

Other database systems, however, may not include native support for update management. Update tokens may be derived from other sources in this instance. In some instances, for example, an application engine 132 may generate new documents whenever substantive information in the object is changed. Such procedures are common in financial applications, for example, when it is necessary not only to store complete copies of documents but also to identify complete document histories reflecting changes thereto. When such policies are in effect, new documents are created on each document change. Each new document is assigned its own document identifier. In such embodiments, the document identifiers may be taken as update tokens.

In still other applications, database object may not store any data to indicate when/how data therein is changed. In such an embodiment, an update manager 136 may calculate an update token dynamically from substantive data of the data object. For example, the update manager 136 may calculate an update token by applying a hash function to object data retrieved from the database. Hash functions typically generate a unique code in response to a unique set of input data. If a database object is changed, the code output by a hash function should be different than the code that would be generated before the database object was changed. Thus, the hash function code can be used as an effective update token.

The method of FIG. 2 finds particular utility in installations where a computer system employs a wide variety of database storage systems, some of which might have native support for update management and others that do not. The method of FIG. 2 permits an update manager to determine whether a retrieved data object already stores an update token—either as administrative data or as substantive data of the corresponding application—and, if not, to generate an update token dynamically.

Even in situations where a particular database natively supports update controls by timestamps or update counters, it may be beneficial to dynamically create update tokens using the hash function. In some instances, data inconsistencies might be tolerated within a data object for certain fields but not for others. In such a case, an update manager may apply the hash function to those fields for which data inconsistencies cannot be tolerated, omitting other fields. If a first update is directed to field which is not included in the calculation of the hash value, then the hash value will not change. A second update may occur to the data object even if the update is based on object data that had been read from the object before the first update occurred. The first update does not cause an error because it does not change the local hash value. The local hash value may be equal to the hash value returned as part of the second update. Thus, the hash function provides for a more graceful implementation of update management policies than other possible approaches.

FIG. 3 illustrates a method 300 of confirming a database write request according to an embodiment of the present invention. To request a write of data to a database object, a client may provide the data to be written and a copy of an update token that it had been provided when reading data from the database object at some point earlier (called the "client update token" for purposes of the present discussion). In response to the write request, the method 300 may retrieve a copy of the addressed database object from the database (box 310). The method 300 may determine whether the object has an update token, called the "local update token" for purposes of the present discussion (box 320). If not, the method 300 may calculate the local update token using data resident in the retrieved object (box 330). Thereafter or if, at box 320, the object had a local update token, the method 300 may compare the local update token to the client update token (box 340). If they match, the method 300 confirms that the requested write operation may proceed (box 350).

If the local update token does not match the client update token, it indicates that the contents of the database have been changed in the time period between the client's read of data from the object and the present time. If the requested write operation were permitted, it could cause data consistency problems. Accordingly, the method 300 may transmit a copy of the object and the local update token back to the client 300 or simply indicate an error. The method 300 may conclude.

If an error is detected at box 360, a user interface at the client side (not shown) may indicate that the requested write could not be completed and display new data of the object. The user interface may provide a prompt that displays current object data and permits the user to confirm that the write request be resubmitted. If such confirmation is received, the client may resubmit the write request with the new update token. The method 300 of FIG. 3 may be repeated and, if it completes without error, the write request may be performed at box 350.

FIG. 4 is a dataflow diagram 400 illustrating exemplary communication flow among three elements of a computer network: two client terminals 410A, 410B and a server 420. For the purposes of the present discussion, it may be assumed that the server 120 executes an application having an update manager integrated therewith and stores application data in a database (components not shown in FIG. 4). The initial value of an update token may be assumed to be 1. As shown in FIG. 4, both clients 410A, 410B may issue read requests to a common data object (452, 456) and may be provided copies of the requested objects and the update token (454, 460). During the ordinary course of operation at each of the clients, the requested data may be updated. One of the client terminals (say, client 410B) may transmit a request to store its updated object data at the server (462). The client 410B furnishes its copy of the update token as well. An update manager within the server may compare the furnished copy of the update token with its local copy, determine that they match and, therefore, may permit the updated data to be stored (464). At this point the update token may be changed, either expressly or by implication due to the changes to the data object (represented by 466).

Thereafter, client 410A sends its store request to the server 120 with its now stale version of the update token. The server's update manager may compare the furnished copy of the update token with its local copy, determine that they do not match and generate an error condition (470). The server 420 may furnish a current copy of the data object and the updated update token to the requesting client 410A (472). Thereafter, an operator at the client terminal 410A may be prompted to confirm the initial write request (474). If the operator confirms the request, the store request may be resent to the server 420 along with the new update token (476). The server may compare the furnished copy of the update token with its local copy, determine that they match and store updated data to its database (478). At this point the update token may be changed again (480).

If at 474 an operator decides against confirming the initial store request, the communication flow may end.

As another advantage of the foregoing embodiments, note that the client's role in the communication flow is identical no matter what type of update token is used. The client merely caches an update token and returns it to the server when making a subsequent write request. The protocol remains the same for update tokens that are timestamps, update counters, hash codes and document identifiers. Thus, no changes need to be made for deployed client terminals in a network even if substantial upgrades are made to the databases underlying the network applications.

Several embodiments of the invention are specifically illustrated and/or described herein. However, it will be appreciated that modifications and variations of the invention are covered by the above teachings and within the purview of the appended claims without departing from the spirit and intended scope of the invention.

I claim:

1. A data management method, comprising:
   in response to a first read request to read data from a group of databases:
   reading a requested data object referenced by the first read request from a database of the group of databases, and
   returning the requested data object and a first update token to a sender of the first read request, wherein the first update token is generated by applying a hash function to selected data fields of the requested data object for which data inconsistencies cannot be tolerated and the first update token is not changed before any data in the selected data fields of the requested data object is changed, other data fields not selected are omitted by the hash function and the other data fields not selected are data fields for which data inconsistencies can be tolerated; and
   in response to a second read request to read the requested data object from the database:
   returning the requested data object and the first update token to a sender of the second read request,
   in response to a first write request to store updated data for the requested data object to the database:
   storing updated data for the requested data object to the database, the updated data comprise updates to at least one selected data fields for which data inconsistencies cannot be tolerated;
   generating a second update token by applying the hash function to the selected data fields of the requested data object for which data inconsistencies cannot be tolerated;
   in response to a second write request to store updated data for the requested data object to the database:
   comparing the second update token to an update token contained in the second write request to store updated data, and
   when the second update token and the update token contained in the second write request to store updated data match, storing data received in the second write request to the database,
   wherein the second update token and the update token contained in the second write request to store updated data will match even if updates to the requested data object stored at the database have occurred during a time between generation of the update token contained in the second write request to store updated data and the second update token, provided the updates to the stored requested data object are only directed to data fields thereof that are tolerant of data inconsistencies, and
   wherein the group of databases comprise a first database that provides native support for update control that prevents inconsistencies introduced by multiple attempts to update same data simultaneously and a second database that does not provide native support for update control that prevents inconsistencies introduced by multiple attempts to update same data simultaneously.

2. The method of claim 1, wherein the first database natively supports update control by a timestamp stored in the first database in association with a respective data object.

3. The method of claim 1, wherein the first database natively supports update control by a count value representing a number of times a respective data object has been updated in the first database, the count value stored in the first database in association with the respective data object.

4. The method of claim 1, further comprising, when a match does not occur, transmitting the requested data object updated by the first write request and the second update token to the sender of the second write request.

5. The method of claim 1, wherein the database keeps a copy of a most recently generated update token.

6. A computer system, comprising
one or more integrated computer servers each comprising a computer processor, the computer servers being interconnected by a computer network and executing, by respective computer processors:
applications to be used by a plurality of distributed operators, the applications including execution engines and associated data sets stored in a group of databases, wherein among the group of databases, a first database provides native support for update control that prevents inconsistencies introduced by multiple attempts to update same data simultaneously, and a second database does not provide any native support for update control, and
an update manager to govern update operations from disparate users to the data sets stored in the group of databases, the update manager adapted to:
in response to a first read request to read data from the group of databases:
read a requested data object referenced by the first read request from a database of the group of databases, and
return the requested data object and a first update token to a sender of the first read request, wherein the first update token is generated by applying a hash function to selected data fields of the requested data object for which data inconsistencies cannot be tolerated and the first update token is not changed before any data in the selected data fields of the requested data object is changed, other data fields not selected are omitted by the hash function and the other data fields not selected are data fields for which data inconsistencies can be tolerated; and
in response to a second read request to read the requested data object from the database:
return the requested data object and the first update token to a sender of the second read request,
in response to a first write request to store updated data for the requested data object to the database:
store updated data for the requested data object to the database, the updated data comprise updates to at least one selected data fields for which data inconsistencies cannot be tolerated;
generate a second update token by applying the hash function to the selected data fields of the requested data object for which data inconsistencies cannot be tolerated;
in response to a second write request to store updated data for the requested data object to the database:
compare the second update token to an update token contained in the second write request to store updated data, and
when the second update token and the update token contained in the second write request to store updated data match, store data received in the second write request to the database,
wherein the second update token and the update token contained in the second write request to store updated data will match even if updates to the requested data object stored at the database have occurred during a time between generation of the update token contained in the second write request to store updated data and the second update token, provided the updates to the stored requested data object are only directed to data fields thereof that are tolerant of data inconsistencies.

7. The computer system of claim 6, further comprising a plurality of client terminals in communication with the one or more integrated computer servers.

8. The computer system of claim 6, wherein the first database natively supports update control by a timestamp stored in the first database in association with a respective data object.

9. The computer system of claim 6, wherein the first database natively supports update control by a count value representing a number of times a respective data object has been updated in the first database, the count value stored in the first database in association with the respective data object.

10. The computer system of claim 6, further comprising, when a match does not occur, transmit the requested data object updated by the first write request and the second update token to the sender of the second write request.

11. The computer system of claim 6, wherein the database keeps a copy of a most recently generated update token.

12. An apparatus for data management, the apparatus comprising:
a memory device having executable instructions stored therein; and
a processor in operable communication with the memory device and operative to:
in response to a first read request to read data from a group of databases:
read a requested data object referenced by the first read request from a database of the group of databases, and
return the requested data object and a first update token to a sender of the first read request, wherein the first update token is generated by applying a hash function to selected data fields of the requested data object for which data inconsistencies cannot be tolerated and the first update token is not changed before any data in the selected data fields of the requested data object is changed, other data fields not selected are omitted by the hash function and the other data fields not selected are data fields for which data inconsistencies can be tolerated; and
in response to a second read request to read the requested data object from the database:
return the requested data object and the first update token to a sender of the second read request,
in response to a first write request to store updated data for the requested data object to the database:
store updated data for the requested data object to the database, the updated data comprise updates to at least one selected data fields for which data inconsistencies cannot be tolerated;
generate a second update token by applying the hash function to the selected data fields of the requested data object for which data inconsistencies cannot be tolerated;
in response to a second write request to store updated data for the requested data object to the database:
compare the second update token to an update token contained in the second write request to store updated data, and
when the second update token and the update token contained in the second write request to store updated data match, store data received in the second write request to the database,
wherein the second update token and the update token contained in the second write request to store updated data will match even if updates to the requested data object stored at the database have occurred during a time between generation of the update token contained in the second write request to store updated data and the second update token, provided the updates to the stored requested data object are only directed to data fields thereof that are tolerant of data inconsistencies, and wherein the group of databases comprise a first database that provides native support for update control that prevents inconsistencies introduced by multiple attempts to update same data simultaneously and a second database that does not provide native support for update control that prevents inconsistencies introduced by multiple attempts to update same data simultaneously.

13. The apparatus of claim 12, wherein the first database natively supports update control by a timestamp stored in the first database in association with a respective data object.

14. The apparatus of claim 12, wherein the first database natively supports update control by a count value representing a number of times a respective data object has been updated in the first database, the count value stored in the first database in association with the respective data object.

15. The apparatus of claim 12, further comprising, when a match does not occur, transmit the requested data object updated by the first write request and the second update token to the sender of the second write request.

16. The apparatus of claim 12, wherein the database keeps a copy of a most recently generated update token.

* * * * *